United States Patent
Ohashi

(10) Patent No.: US 11,321,930 B2
(45) Date of Patent: May 3, 2022

(54) TERMINAL DEVICE, SERVER DEVICE, AND INFORMATION PROCESSING SYSTEM

(71) Applicant: Sony Interactive Entertainment Inc., Tokyo (JP)

(72) Inventor: Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/082,272

(22) Filed: Oct. 28, 2020

(65) Prior Publication Data

US 2021/0142574 A1 May 13, 2021

(30) Foreign Application Priority Data

Nov. 11, 2019 (JP) .............................. JP2019-204249

(51) Int. Cl.
  *G06V 20/20* (2022.01)
  *G06T 19/00* (2011.01)
  *G06F 3/01* (2006.01)

(52) U.S. Cl.
  CPC ............ *G06T 19/006* (2013.01); *G06F 3/011* (2013.01); *G06V 20/20* (2022.01)

(58) Field of Classification Search
  CPC ... G06T 19/006; G06K 9/00671; G06F 3/011; A63F 13/69; A63F 13/577; A63F 13/65; A63F 13/216; A63F 13/35
  See application file for complete search history.

(56) References Cited

U.S. PATENT DOCUMENTS

| | | | |
|---|---|---|---|
| 6,559,870 B1* | 5/2003 | Anabuki ................. | G06F 3/011 345/419 |
| 2002/0062360 A1* | 5/2002 | Ishiguro .................. | H04L 29/06 709/219 |
| 2013/0088577 A1* | 4/2013 | Hakkarainen ...... | H04N 5/23293 348/46 |
| 2013/0157762 A1* | 6/2013 | Yamaguchi ........... | A63F 13/525 463/31 |
| 2013/0234914 A1* | 9/2013 | Fujimaki ................. | G06F 3/011 345/8 |
| 2015/0356774 A1* | 12/2015 | Gal ......................... | G06T 19/20 345/633 |
| 2016/0033770 A1* | 2/2016 | Fujimaki .............. | H04N 13/344 345/8 |
| 2018/0260843 A1* | 9/2018 | Hiranandani ...... | G06K 9/00671 |
| 2019/0197599 A1* | 6/2019 | Zia ...................... | G06Q 30/0641 |
| 2019/0371079 A1* | 12/2019 | Du ........................ | G06T 15/005 |

* cited by examiner

*Primary Examiner* — Jitesh Patel
(74) *Attorney, Agent, or Firm* — Katten Muchin Rosenman LLP

(57) ABSTRACT

Disclosed herein is a terminal device connected to a server device in a communicable manner. The terminal device includes a position identification section that identifies a position in an actual space, a setting section that sets a virtual space associated with content associated information associated with predetermined content in the actual space, the setting section setting the virtual space in an occupying space while defining a predetermined range in the actual space as the occupying space, and a performance section that receives the content associated information in the virtual space from the server device and performs predetermined information processing.

8 Claims, 4 Drawing Sheets

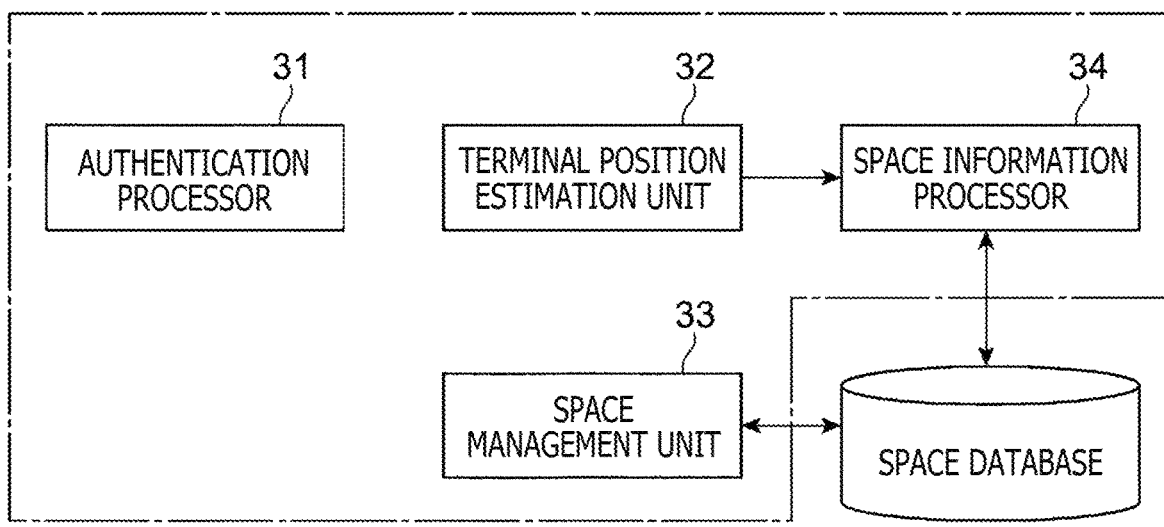

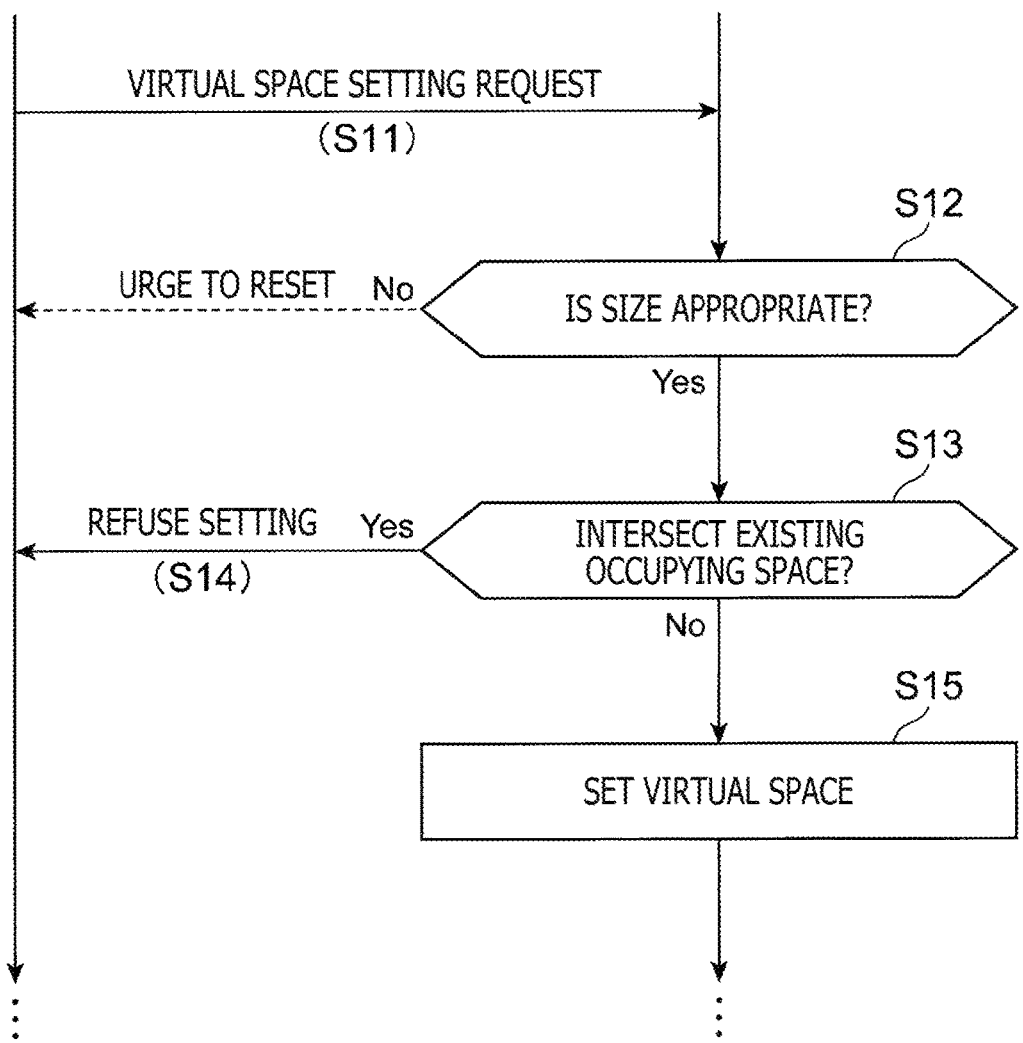

TERMINAL DEVICE, SERVER DEVICE, AND INFORMATION PROCESSING SYSTEM

CROSS REFERENCE TO RELATED APPLICATIONS

This application claims the benefit of Japanese Priority Patent Application JP 2019-204249 filed Nov. 11, 2019, the entire contents of which are incorporated herein by reference.

BACKGROUND

The present disclosure relates to a terminal device, a server device, and an information processing system.

In recent years, it has been becoming possible to play a game that sets a virtual space in a superimposed manner on an actual space by using position information utilizing a global positioning system (GPS), the game being developed in the set virtual space (so-called augmented reality (AR) game). In such a game, examples of possible processing include processing in which a server device displays, on each of smartphones of a plurality of players located in the vicinity of a spot determined in advance in the actual space, the virtual space set according to the spot and causes a target character to appear in the virtual space, and a physical strength gauge of the target character is lowered on receipt of attacking operations by the plurality of players.

SUMMARY

However, in the case of playing a game in which a common virtual space as in the above-described related art is used, at present, each player needs to install a predetermined application regarding the game in, for example, his or her smartphone in advance. Further, in a case where there are a plurality of kinds of AR games that use a common spot in the actual space, positions in the actual space corresponding to objects present in the respective virtual spaces displayed on terminals of players who play AR games different from each other overlap each other in some cases. In such a case, since the positions in the actual space compete with each other, a problem arises when each of the players performs an action such as virtually touching the object. Therefore, in the above-described related-art technology, respective virtual spaces are displayed on individual terminals of the players, and it is difficult for the plurality of players to share a space, in content of a game or the like, superimposed on the actual space.

The present disclosure has been made in view of the above-described circumstances, and it is desirable to provide a terminal device, a server device, and an information processing system allowing a plurality of users to share a space in content superimposed on an actual space.

According to an embodiment of the present disclosure, there is provided a terminal device connected to a server device in a communicable manner, the terminal device including a position identification section that identifies a position in an actual space, a setting section that sets a virtual space associated with content associated information associated with predetermined content in the actual space, the setting section setting the virtual space in an occupying space while defining a predetermined range in the actual space as the occupying space, and a performance section that receives the content associated information in the virtual space from the server device and performs predetermined information processing.

According to another embodiment of the present disclosure, there is provided a server device connected to a terminal device in a communicable manner, the server device including a position-related information reception section that receives information for identifying a position of the terminal device in an actual space from the terminal device, a request acceptance section that accepts a request for setting a virtual space associated with content associated information associated with the predetermined content in the actual space, the request being for setting the virtual space in an occupying space while defining a predetermined range in the actual space as the occupying space, and a setting section that performs processing for setting the virtual space based on the request, the setting section performing predetermined processing in a case where a range, in the actual space, occupied by the requested occupying space and a range, in the actual space, occupied by another occupying space that is already set based on a request accepted from another user overlap each other.

According to a further embodiment of the present disclosure, there is provided an information processing system including a terminal device and a server device connected to the terminal device in a communicable manner. The terminal device includes a position identification section that identifies a position, in an actual space, of the terminal device, and a setting section that sets a virtual space associated with content associated information associated with predetermined content in the actual space, the setting section setting the virtual space in an occupying space by defining a predetermined range, in the actual space, as the occupying space. The server device transmits the content associated information in the set virtual space to a terminal device present in the occupying space in which the virtual space is set.

According to the embodiments of the present disclosure, a plurality of users can share a space in content superimposed on an actual space.

BRIEF DESCRIPTION OF THE DRAWINGS

FIG. 2 is an explanatory diagram illustrating an example of a position information database used in the information processing system according to the exemplary embodiment of the present disclosure;

FIG. 3 is a functional block diagram illustrating an example of a server device according to the exemplary embodiment of the present disclosure;

FIG. 4 is an explanatory diagram illustrating an example of a content database used by the server device according to the exemplary embodiment of the present disclosure;

FIG. 5 is a flowchart illustrating an operation example of the information processing system according to the exemplary embodiment of the present disclosure.

DETAILED DESCRIPTION OF THE PREFERRED EMBODIMENT

Figure 1:
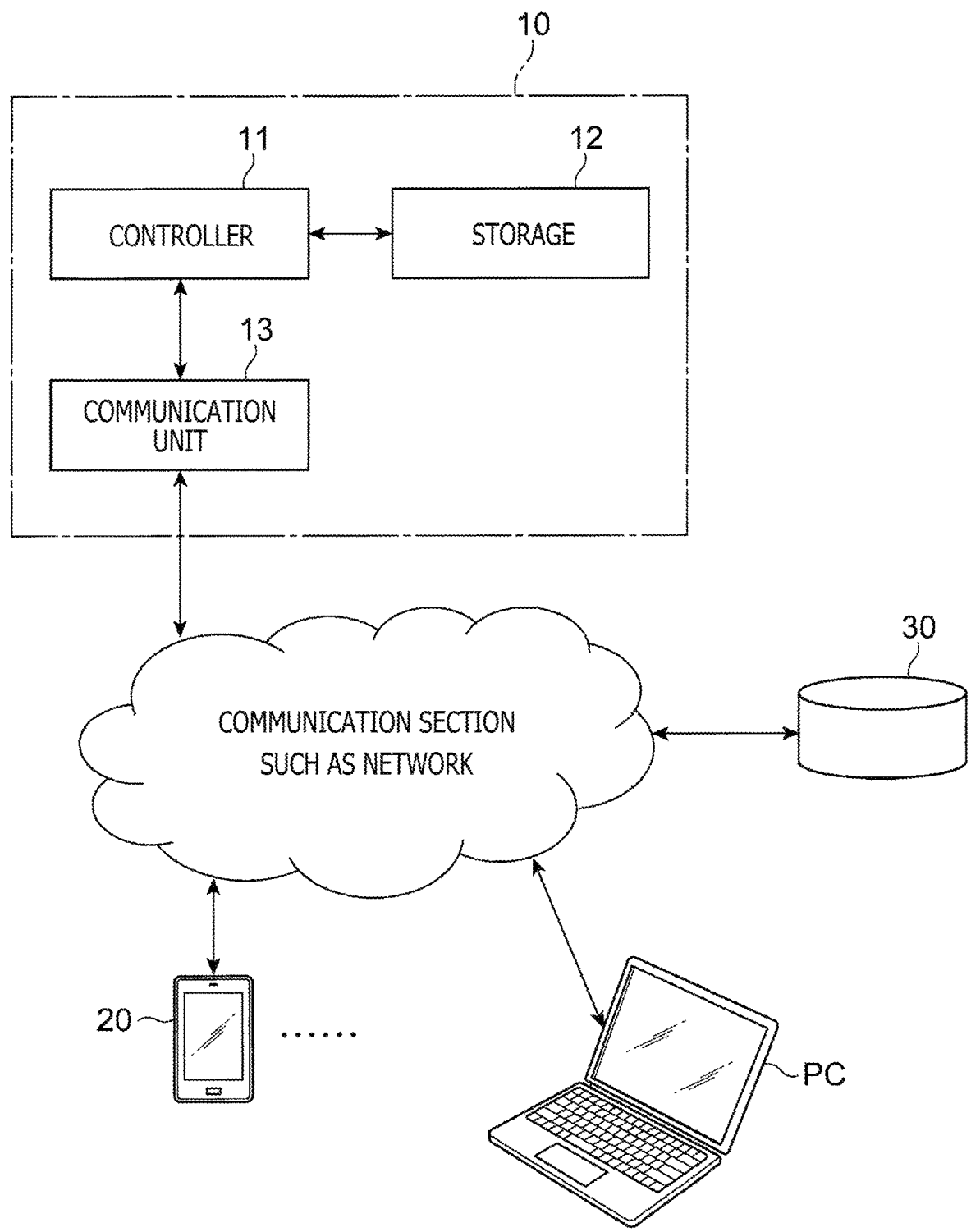
FIG. 1 is a block diagram illustrating a configuration example of an information processing system according to an exemplary embodiment of the present disclosure.

An exemplary embodiment of the present disclosure will be described with reference to the drawings. As illustrated in FIG. 1, an information processing system according to the exemplary embodiment of the present disclosure includes a server device 10, a terminal device 20 carried by a user, a personal computer PC, and the like all of which are mutually connected in a communicable manner. Further, the server device 10 is connected with a position information management server 30 in a communicable manner.

The position information management server 30 is a so-called AR cloud server and includes a position information database associating information (S) regarding a predetermined feature point in an image captured of each location with position information (P) of the location as illustrated in FIG. 2.

When receiving an inquiry regarding the position information together with the information regarding the feature point from the server device 10, for example, the position information management server 30 uses the information regarding the feature point thus received as a key and searches for information regarding a feature point corresponding to (similar to) the information regarding the feature point used as the key from the position information database. When the information is found by the search, the position information management server 30 obtains position information associated with the found information. This position information may include, in addition to information indicating a position in a global coordinate system such as latitude/longitude information, posture information (e.g., information indicating a three-dimensional orientation in the global coordinate system: global pose information) at the position. The position information management server 30 then provides the server device 10 or the like that is a request source with the obtained position information.

Note that, in the present exemplary embodiment, it is assumed that the global coordinate system is a coordinate system that defines a position and a height on the ground and indicates the values with a latitude, a longitude, and an altitude, for example.

As illustrated in FIG. 1, the server device 10 is a general server computer including a controller 11, a storage 12, and a communication unit 13. The controller 11 is a program-controlled device such as a central processing unit (CPU) and operates according to a program stored in the storage 12.

In an example in the present exemplary embodiment, the controller 11 executes the program stored in the storage 12 and receives position detection information from the terminal device 20. The position detection information is information that may be necessary to identify a position of the terminal device 20 in an actual space and will be described in detail later.

The controller 11 identifies the position of the terminal device 20 in the actual space based on the position detection information received from the terminal device 20. As an example, the position detection information received from the terminal device 20 includes information regarding the feature point extracted from image data captured by the terminal device 20. In this example, the controller 11 transmits the information regarding the feature point to the position information management server 30, obtains the global pose information (global pose information of a camera that has captured the image data on the terminal device 20 side) as information regarding the position of the terminal device 20 in the actual space, and transmits the obtained information to the terminal device 20.

The controller 11 also functions as a request acceptance section and accepts, from a user, a request for setting a virtual space for disposing a virtual object in the actual space, for example. This request is transmitted from the personal computer PC or the terminal device 20, which is operated by the user, to the server device 10 and is to define a predetermined range in the actual space as an occupying space to set the virtual space in the occupying space. In an example of the present exemplary embodiment, this request includes information for identifying the predetermined range in the actual space, which indicates the occupying space, and information for identifying content associated information to be associated with the virtual space to be set in the occupying space.

Herein, the information for identifying the predetermined range in the actual space, which indicates the occupying space, is information for identifying a rectangular parallelepiped space having a predetermined size (that may be determined based on the content associated information) while defining a specified position as a center of a bottom surface, for example.

Examples of the content associated information include various information such as a program (game logic) of game content to be executed in the virtual space, model information (three-dimensional model information) regarding a virtual object to be disposed in the virtual space, an effect such as particles to be displayed in the virtual space, a process for various kinds of presentation, a user interface that is presented to the user of the terminal device 2 and is displayed to accept an input from the user, a program (logic) for accepting selection and an operation through the user interface, a text displayed for a predetermined operation or the like, a sound effect or voice to be sounded, and background music (BGM).

The controller 11 functions as a setting section, performs processing for setting the virtual space based on the request, and records information (occupying space identification information) for identifying a range to which the occupying space is to be set in the actual space and information (e.g., content associated information) regarding the virtual space to be set in the occupying space in association with each other in a space database. This defines a predetermined range in the actual space as the occupying space and sets the virtual space in the occupying space. At this time, the controller 11 checks whether or not the range, in the actual space, occupied by the requested occupying space and a range, in the actual space, occupied by another occupying space already set based on a request accepted from another user who is different from the user who has issued the request overlap each other. In a case where the controller 11 determines that those overlap each other, the controller 11 performs processing for refusing the setting of the virtual space or performs predetermined processing for setting the virtual space, for example, setting a range excluding an overlapping portion as the occupying space.

During a period when at least one terminal device 20 is present in the occupying space in which the virtual space is set, the controller 11 further transmits the content associated information in the virtual space thus set to the terminal device 20 (to each terminal device 20, if a plurality of terminal devices 20 are present). For example, even to the terminal device 20 of another user different from the person who has set the virtual space, during a period when this terminal device 20 is present in the occupying space, the controller 11 transmits the content associated information in the virtual space set in the occupying space. A detailed operation of the controller 11 will be described later.

The storage 12 includes at least one memory device such as a random access memory (RAM) and retains a program to be executed by the controller 11. Further, the storage 12 also operates as a work memory of the controller 11. In the present exemplary embodiment, a space database may be recorded in the storage 12. The space database associates the information (occupying space identification information) for identifying the range to which the occupying space is set in the actual space, the information (e.g., content associated information) regarding the virtual space to be set in the occupying space, and information for identifying the user who has set the occupying space with each other.

The communication unit 13 is, for example, a network interface as a position-related information reception section and transmits and receives various kinds of information with the position information management server 30 and the terminal device 20 according to an instruction input from the controller 11.

The terminal device 20 is, for example, a smartphone that can be carried by the user and is a device that can perform communication with the server device 10. Further, in the present exemplary embodiment, it is assumed that the terminal device 20 includes a head mounted display HMD that is mounted on a head part of the user as a display section and projects an image of the actual space and an image of the virtual space on the eyes of the user. Herein, an imaging device such as a camera is provided in the head mounted display HMD and captures an image in front of the user (along a direction in which the user is viewing).

In an example of the present exemplary embodiment, the terminal device 20 is carried by the user, functions as a position identification section, repeatedly generates the position detection information for identifying a position in the actual space at each predetermined timing, and transmits the generated position detection information to the server device 10. Specifically, the position detection information may be image data itself captured by the camera provided in the head mounted display HMD mounted on the head part of the user or may be information regarding a feature point extracted from the image data by the terminal device 20 under predetermined conditions.

The feature point may be a feature point used in a so-called simultaneous localization and mapping (SLAM) technology, such as a vertex of a polygon-shaped body captured as image data. Further, the position detection information may include position information based on a signal received from, for example, a GPS satellite (to be called GPS position information). In the example of the present exemplary embodiment, this GPS position information serves as an example of wide-area position identification information. However, the wide-area position identification information is not limited to the information obtained by using the GPS, and various kinds of information can be used such as a method based on, for example, disposition data of an access point of a wireless local area network (LAN) or information regarding a position in a mobile phone communication network.

The terminal device 20 transmits the obtained position detection information to the server device 10. At this time, the terminal device 20 and the server device 10 may be connected to each other with a secure communication method. As the secure communication method, various methods may be used, for example, a method using a secure socket layer (SSL) and a method for encrypting information with a predetermined method.

The terminal device 20 of the present exemplary embodiment receives, from the server device 10, the global pose information based on the position detection information transmitted by the terminal device 20. The global pose information is obtained based on the position detection information, and therefore, in the example of the present exemplary embodiment, the global pose information indicates a position and a direction of the head part of the user (more specifically, the head mounted display HMD mounted on the head part) in the global coordinate system.

The terminal device 20 of the present exemplary embodiment also configures a setting section that sets the virtual space associated with the content associated information received from the server device 10 in the actual space. In other words, the terminal device 20 defines a predetermined range in the actual space as the occupying space and sets the virtual space in the occupying space. An operation of the terminal device 20 for setting the occupying space will be described later.

The terminal device 20 also functions as a performance section, receives the content associated information from the server device 10, and performs information processing using the received information. For example, the terminal device 20 includes a three-dimensional model of a virtual object and its arrangement (coordinate information in the virtual space) as the content associated information.

By using its own global pose information (of the head mounted display HMD) received from the server device 10, the terminal device 20 sets the virtual space so as to be superimposed on the actual image after setting the coordinate system of the virtual space in the actual space, arranges the virtual object in the virtual space thus set, and renders an image of the virtual object to present the image to the user. Note that the virtual object may be represented with a point group (point cloud).

This processing allows the user to view the image in the virtual space while being superimposed on the actual space. In this example in the present exemplary embodiment, since each terminal device 20 sets the coordinate system of the virtual space in the actual space based on its own global pose information, to each user viewing the common actual space, an image obtained when visually recognizing, from a position of each user, the object in the corresponding virtual space is presented.

The processing of the server device 10 that presents the image of the virtual space and the terminal device 20 can use widely-known processing as processing of so-called AR, and therefore detailed description is omitted herein.

Next, an operation of the controller 11 of the server device 10 in the present exemplary embodiment will be described. In the present exemplary embodiment, as illustrated in FIG. 3, the controller 11 includes an authentication processor 31, a terminal position estimation unit 32, a space management unit 33, and a space information processor 34.

The authentication processor 31 accepts a user request from the terminal device 20 or the personal computer and authenticates the user who has issued the request. This authentication processing can be performed with a widely-known method that uses authentication information of the user (e.g., certificate information or information for identifying a user name) which has been issued in advance. When succeeding in the user authentication, the authentication processor 31 outputs information indicating the successful user authentication to each unit.

The terminal position estimation unit 32 functions as a position identification section and repeatedly receives the position detection information at each predetermined timing from the terminal device 20 of the user for which the authentication in the authentication processor 31 is succeeded. The terminal position estimation unit 32 transmits information regarding the feature point, which is included in the position detection information, to the position information management server 30. The terminal position estimation unit 32 then receives the global pose information as the position information from the position information management server 30 and outputs the global pose information to the terminal device 20 that is a transmission source of the position detection information.

Note that in a case where the terminal device 20 transmits the GPS position information obtained with, for example, the GPS, the terminal position estimation unit 32 may transmit the GPS position information together with the information regarding the feature point to the position information management server 30 to allow a range in which the feature point is searched for to be determined using the GPS position information.

Alternatively, when receiving a plurality of pieces of global pose information from the position information management server 30 as a plurality of candidates of position information, the terminal position estimation unit 32 uses the wide-area position identification information such as the GPS position information transmitted from the terminal device 20 to select the global pose information representing a position present in a range of the position identified with the wide-area position identification information. In this manner, in the present exemplary embodiment, the server device 10 may use the wide-area position identification information transmitted from the terminal device 20 and may narrow the range where the terminal device 20 is present in the actual space.

Furthermore, the terminal position estimation unit 32 outputs the information for identifying the terminal device 20 that is the transmission source of the position detection information (this may be information for identifying the user who uses this terminal device 20), and the global pose information received from the position information management server 30, to the space information processor 34.

The space management unit 33 accepts a request for setting the virtual space (virtual space setting request) from the terminal device 20 or the personal computer of the user for which the authentication in the authentication processor 31 is succeeded. In the present exemplary embodiment, this request includes the occupying space identification information for identifying a region in the actual space (occupying space) serving as a range on which the virtual space is superimposed, and the content identification information for identifying content to be presented in the virtual space.

In an example in the present exemplary embodiment, it is assumed that the content associated information of the content that can be presented in the virtual space is provided in advance. Specifically, as illustrated in FIG. 4, the server device 10 retains a content database including at least one entry (E) that associates content identification information (ID) unique to each content for identifying the content, a minimum range of the virtual space used to present this content (respective lengths in X, Y, Z-axis directions that are orthogonal to each other; Vmin, hereinafter called a minimum size), a maximum range of the virtual space in which content can be presented (respective lengths in the X, Y, Z-axis directions; Vmax, hereinafter called a maximum size), and the content associated information (C) with each other.

In this example, when requesting the setting of the virtual space, the user selects one piece of content stored in this content database together with information for identifying a space to be occupied to identify the content to be presented in the virtual space.

In a case where the setting of the virtual space is requested using a device that is not carried by the user such as the personal computer PC, the occupying space identification information may identify a bottom surface (defined as an XY surface) of a hexahedral space serving as the occupying space using, for example, map information. At this time, the user specifies a rectangular area on a map, the rectangular area having a size that exceeds a size of the bottom surface, which is indicated by the minimum size, and does not exceed a size of the bottom surface, which is indicated by the maximum size, the minimum size and the maximum size being stored in the content database while being associated with the information for identifying the selected content.

Furthermore, also in a case where the user inputs the occupying space identification information using a device that is carried by the user such as the terminal device 20, the user may input using, for example, the map information, similar to the above-described example. Alternatively, the user may actually visit a location in the actual space to which the virtual space is set while carrying the terminal device 20, operate the terminal device 20 at a center of a bottom surface of a hexahedral space serving as the occupying space, and specify a region having the size that exceeds the size of the bottom surface, which is indicated by the minimum size, and does not exceed the size of the bottom surface, which is indicated by the maximum size, the minimum size and the maximum size being stored in the content database while being associated with the information for identifying the selected content.

Note that as a size in a Z-axis direction (height direction), the user may input any value, or a value determined in advance as a default for each piece of content may be used.

The space management unit 33 accepts the virtual space setting request including the above-described occupying space identification information and the content identification information and performs the setting processing of the virtual space. In other words, the space management unit 33 refers to the space database and checks whether or not another occupying space that is already set is present in a range, in the actual space, overlapping a range, in the actual space, indicated by the accepted occupying space identification information (a range, in the actual space, occupied by the requested occupying space).

This processing is performed, for each entry included in the space database, by checking whether or not the hexahedral region, in the actual space, indicated by the occupying space identification information included in the entry and the hexahedral region, in the actual space, indicated by the occupying space identification information according to the virtual space setting request overlap each other. The respective regions in the actual space can be represented in the global coordinate system, and checking whether or not the regions overlap each other can be performed with a publicly-known processing that performs intersection determination of each hexahedral region.

Among the entries included in the space database, when an entry in which the hexahedral region, in the actual space, indicated by the occupying space identification information included in the entry and the hexahedral region, in the actual space, indicated by the occupying space identification information according to the virtual space setting request overlap (intersect) each other is present, the space management unit 33 performs processing for refusing the setting of the virtual space or performs predetermined processing for setting the virtual space, for example, setting a range excluding an overlapping portion as the occupying space.

Specifically, the space management unit 33 instructs the terminal device 20 or the personal computer PC, which is the transmission source of the virtual space setting request, to display a message indicating that it is difficult to set the requested virtual space due to presence of the already set virtual space. This allows the user to select another location, for example.

On the other hand, among the entries included in the space database, when an entry in which the hexahedral region, in the actual space, indicated by the occupying space identification information included in the entry and the hexahedral region, in the actual space, indicated by the occupying space identification information according to the virtual space setting request overlap (intersect) each other is not present, the space management unit 33 performs the processing for setting the virtual space.

In other words, the space management unit 33 stores, in the space database, the entry associating the occupying space identification information received as the virtual space setting request, the content identification information for identifying the content to be presented in the virtual space to be set in the occupying space, and the information for identifying the user who has issued the virtual space setting request (the information accepted at the authentication may be used) with each other.

The space information processor 34 repeatedly accepts, from the terminal position estimation unit 32, the position information (global pose information) for each terminal device 20 together with the information for identifying the terminal device 20 at each predetermined timing (for each reception of the position detection information from the terminal device 20).

For each acceptance of the information, the space information processor 34 checks whether or not the position information of the terminal device 20, which is identified with the accepted information, is present in the occupying space indicated by the occupying space identification information included in any entry recorded in the space database.

Herein, when the occupying space identification information, for identifying the occupying space, including the position information of the terminal device 20 identified by the accepted information is stored in the space database, the space information processor 34 transmits the content associated information of the content identified by the content identification information, which is stored in the space database while being associated with the occupying space identification information, to the terminal device 20 identified by the accepted information together with the position information included in the occupying space.

In other words, the space information processor 34 transmits the content associated information of the content associated with the virtual space thus set to the terminal device 20 (to each terminal device 20, if a plurality of terminal devices 20 are present) present in the occupying space to which the virtual space is set. This processing is performed even when the terminal device 20 present in the occupying space is possessed by a user different from the user who sets the occupying space with his or her terminal device 20.

[Operation]

The present exemplary embodiment includes the above-described configuration and operates as described below. As illustrated in FIG. 5, in an example in the present exemplary embodiment, the user who succeeded in the authentication from the server device 10 while operating, for example, the personal computer PC identifies an open region, in the actual space, such as a park as the occupying space and issues the virtual space setting request to the server device 10 (S11).

This request includes the above-described occupying space identification information and the content identification information for identifying the content to be presented in the virtual space to be set in the occupying space identified by the occupying space identification information. It is assumed that, as the content, the example herein of the present exemplary embodiment sets content in which a range lower than a predetermined height (e.g., 2.0 m) from the ground is set as a range below a sea level, a plurality of models each having a fish-shape are disposed as three-dimensional virtual objects in this range, and the models are moved over time (an animation imitating motion of the fish may be accompanied).

The server device 10 reads the minimum size and the maximum size of the virtual space, which are recorded in the content database while being associated with the received content identification information, and checks whether or not the size of the requested occupying space includes the minimum size and is included in the maximum size (size appropriateness determination: S12). In a case where the size of the requested occupying space does not satisfy this condition, the server device 10 urges the user to reset the occupying space.

In contrast, in a case where the size of the requested occupying space satisfies this condition, the server device 10 refers to the space database and checks whether or not the entry including the occupying space identification information for identifying the occupying space that intersects the range, in the actual space, occupied by the requested occupying space is already present (S13).

Among the entries included in the space database, when an entry in which the region, in the actual space, indicated by the occupying space identification information included in the entry and the region, in the actual space, indicated by the occupying space identification information according to the virtual space setting request overlap (intersect) each other is present, the server device 10 performs the processing for refusing the setting of the virtual space (S14).

Specifically, the server device 10 transmits information indicating the fact that setting of the virtual space is failed to the user and urges the user to reset the occupying space.

In step S13, among the entries included in the space database, when an entry in which the region, in the actual space, indicated by the occupying space identification information included in the entry and the region, in the actual space, indicated by the occupying space identification information according to the virtual space setting request overlap (intersect) each other is not present, the server device 10 starts the processing for setting the virtual space (S15).

In step S15, the server device 10 stores, in the space database, the entry associating the occupying space identification information received as the virtual space setting request, the content identification information for identifying the content to be presented in the virtual space to be set in the occupying space, and the information for identifying the user who has issued the virtual space setting request (the information accepted at the authentication may be used) with each other.

Figure 6:
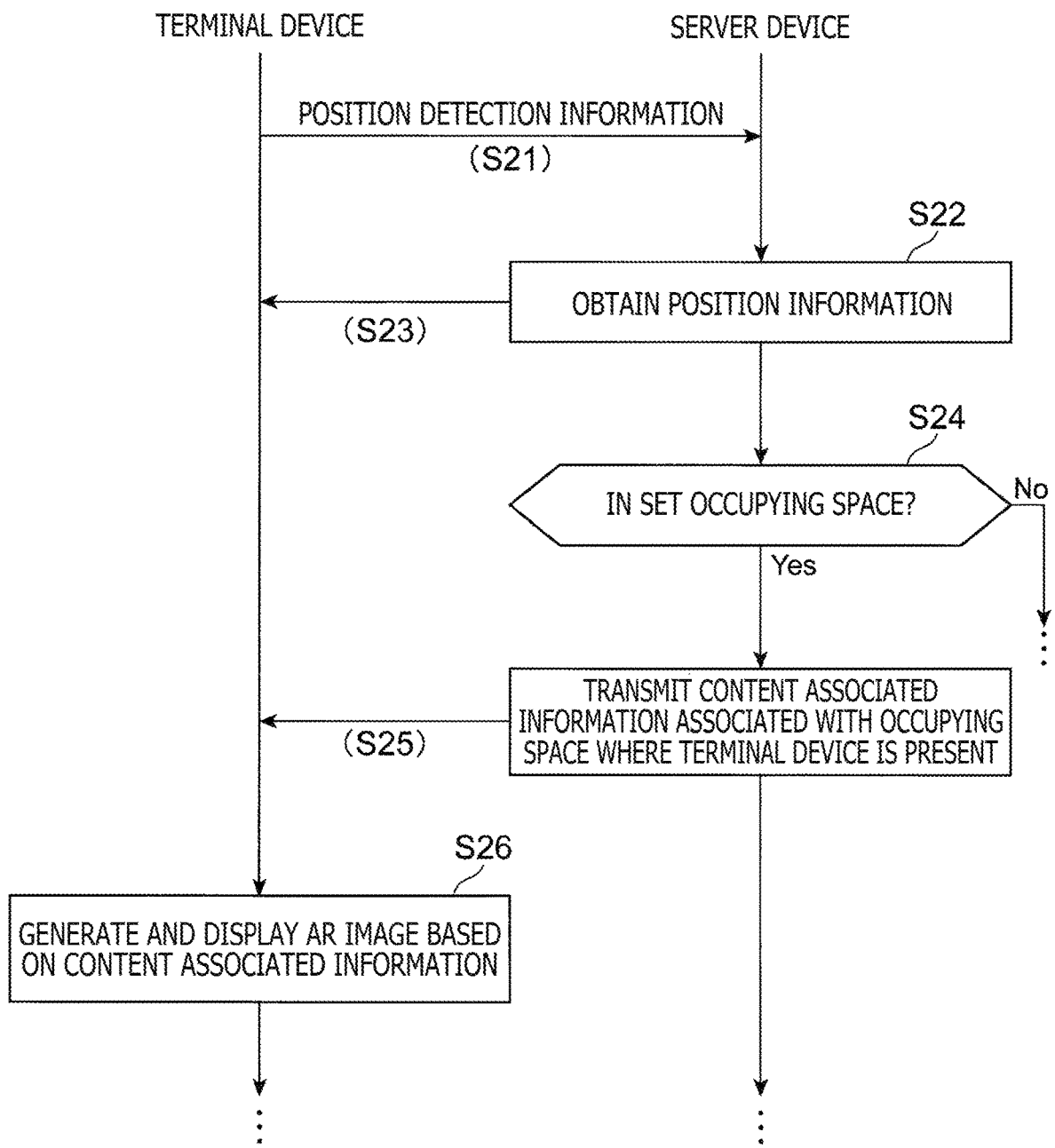
FIG. 6 is a flowchart illustrating another operation example of the information processing system according to the exemplary embodiment of the present disclosure.

The information processing system in the present exemplary embodiment performs processing for presenting the content to the user. In this processing, as illustrated in FIG. 6, the terminal device 20 (each terminal device 20, in a case where a plurality of terminal device 20 are present) repeatedly generates the position detection information for identifying the position in the actual space at each predetermined timing and transmits the position detection information to the server device (S21). Note that, in the following description, it is assumed that the user of the terminal device 20 is already authenticated by the server device 10.

The server device 10 obtains the global pose information (position information) corresponding to the position detection information stored in the position information management server 30 every time the server device 10 receives the position detection information from the terminal device 20 (S22) and outputs the global pose information to the terminal device 20 that is the transmission source of the position detection information (S23).

Furthermore, the server device 10 checks whether or not the position information of the terminal device 20, which is obtained in step S22, is present in the occupying space indicated by the occupying space identification information included in any entry recorded in the space database (S24).

When the occupying space identification information, for identifying the occupying space, including the position information of the terminal device 20, which is obtained in step S22, is stored in the space database, the server device 10 transmits the content associated information of the content identified by the content associated information, which is stored in the space database while being associated with the occupying space identification information, to the terminal device 20 identified by the information accepted together with the position information included in the occupying space (S25).

When the occupying space identification information, for identifying the occupying space, including the position information of the terminal device 20, which is obtained in step S22, is not stored in the space database, the server device 10 continues the processing without change.

In the example herein, with the processing illustrated in FIG. 6, it is assumed that the user carrying the terminal device 20 enters the occupying space set with the content in which a range lower than 2.0 m from the ground is set as the range below the sea level, the plurality of models each having a fish-shape as three-dimensional virtual objects are disposed in this range, and the models are moved over time (the animation imitating motion of the fish may be accompanied).

At this time, the terminal device 20 accepts the content associated information (information indicating the three-dimensional model of the virtual object and its arrangement) from the server device 10 in step S25, renders an image viewed from the position (the position and the orientation defined by the global pose information) of the terminal device 20, and presents the image disposed while being superimposed on the actual space to the user (S26; as already described, this processing can employ the method that is widely-known as the so-called AR technology).

Thereafter, when the user carrying the terminal device 20 stands at a location higher than 2.0 m from the ground (e.g., on a slide installed in a park), the user is presented with an image depicted such that the sea surface is present below his or her eyes, and when the user moves to a location lower than 2.0 m from the ground, such as sliding down on the slide, the user is presented with an image depicted such that the user dives in the sea at this time.

Note that, in the server device 10, as the processing regarding the content, according to the information defined in advance in the content associated information, in a case where the terminal device 20 that moves beyond the height set as the sea level is present (e.g., in a case where a previous position of the terminal device 20 is under the sea level and a current position of the terminal device 20 is above the sea level, or its reversed case), an animation in which a splash is risen from the sea surface may be combined at a position where the terminal device 20 moves beyond the sea level.

Furthermore, in the present exemplary embodiment, when a plurality of users carry respective terminal devices 20 and are present in the actual space set with the occupying space, each user can visually recognize the virtual object such as a swimming fish at a common position. This accordingly enables communication between the users such as pointing the same fish.

[Other Examples of Content]

The content is not limited to the content in which the user is present in the same space as that of the virtual object and views the animation of the virtual object, and processing in which the user catches or attacks the virtual object by performing, for example, the intersection determination (hitting determination) between the virtual object and the user may be performed. To achieve this processing, processing for recognizing the hand of the user or an actual object held by the hand of the user is performed, and the intersection determination is performed between a position of the hand or object thus recognized (a position, in the actual space, superimposed on the virtual space) and the position, in the virtual space, of the virtual object (a position, in the actual space, when the virtual space is superimposed on the actual space).

Furthermore, the content is not limited to a game and the like, and a virtual object in which products are displayed may be disposed in the virtual space like a shopping mall. The user may instruct the server device 10 to transmit a result of controlling a posture and/or a size of a virtual object in the virtual space when enlarging, contracting, or rotating the products as the virtual object, for example. The terminal device 20 may perform rendering based on the information of the result of the control to present the rendered result to the user.

Further, in this case, according to the content associated information, the server device 10 may perform an action in a so-called shopping mall system, for example, perform payment processing related to the authenticated user when accepting an instruction for purchasing a product, and arrange delivery when the payment is finished.

[Example of Limitation of Occupying Space Setting]

It should be noted that, in the above description, the example for limiting setting of the occupying space limits such that the occupying space cannot be set while being overlapped on the position, in the actual space, where another occupying space is already set. However, in addition to this, in the present exemplary embodiment, the following limitation may be performed, for example.

In an example in the present exemplary embodiment, when accepting the virtual space setting request, the server device 10 determines whether or not a limited range (excluded range) that is set in advance in the actual space intersects a range, in the actual space, identified by the occupying space identification information included in the request.

Herein, it is assumed that, for example, the excluded range has a predetermined range on a map defined as a bottom surface and is sufficiently high (e.g., a height the user does not normally reach such as 1 km). The predetermined range to which the excluded range is set on the map herein is, for example, a roadway, a parking lot, land owned by another person, or an area for which entry is restricted, and is assumed to be set in advance by an administrator of the server device 10.

When accepting the virtual space setting request, the server device 10 performs the processing for refusing the setting of the virtual space in a case where the limited range (excluded range) set in advance in the actual space intersects the range, in the actual space, identified by the occupying space identification information included in the request.

Specifically, the server device 10 instructs the terminal device 20 or the personal computer PC, which is the transmission source of the virtual space setting request, to display a message indicating that the excluded range is included in the requested occupying space. This allows the user to further select another location.

Note that, herein, when accepting the virtual space setting request, the server device 10 performs the processing for refusing the setting of the virtual space in the case where the limited range (including the range to which the occupying space is already set: hereinafter, called the excluded range) set in advance in the actual space intersects the range, in the actual space, identified by the occupying space identification information included in the request. However, when, for example, the excluded range is included in the actual space identified by the occupying space identification information included in the request, the server device 10 may perform the setting of the virtual space by defining a range excluding the excluded range as the occupying space.

In this example, with respect to the excluded range, the server device 10 may dispose a three-dimensional virtual object surrounding the excluded range in the virtual space, and may guide the user carrying the terminal device 20 so as not to enter the excluded range.

Furthermore, in a case where an obstacle difficult for the user to pass through, such as an actual wall or an actual ceiling, is present in the range, in the actual space, identified by the occupying space identification information included in the request (a position of the obstacle is recorded in advance, and determination may be made based on the record), the server device 10 may select any one of regions, in the actual space, partitioned by the obstacle (the user who has issued the request may select), and may perform the setting of the virtual space by defining a range other than the selected region as the excluded range and defining a range excluding the excluded range as the occupying space in the actual space identified by the occupying space identification information.

In a case where the setting of the virtual space is performed by defining the range excluding the excluded range as the occupying space in this manner, since a range narrower than the requested range serves as the occupying space, the processing for refusing the setting of the virtual space may be performed in a case where an area or a volume (requested size) requested by the content presented based on the requested content associated information is included in the content associated information, or in a case where the occupying space of the range excluding the excluded range is narrower than the requested size.

The excluded range may be provided with a condition of date and time. For example, in the case of a roadway vehicles do not enter in a predetermined time zone in a predetermined day of week, control may be performed such that the setting of the virtual space is not refused only during the predetermined time zone in the predetermined day of week.

[Usage Authority of Content]

In the above description, the content associated information may include information related to charged content in which only a user who has paid the fee can issue a request for association with the virtual space.

In this example, in the operation of the controller 11 in the server device 1 as the setting section, when performing the processing for setting the requested virtual space, the controller 11 checks whether or not the user who has issued the request can use the content associated information according to the request (e.g., whether or not payment of the fee is completed, or whether or not the user has usage right determined in advance for each piece of the content associated information). When the user can use the content, the controller 11 records information (occupying space identification information) for identifying the range, in the actual space, to be set as the occupying space, and information (e.g., content associated information) regarding the virtual space to be set in the occupying space while associating those with each other in the space database. The virtual space is thus set in the occupying space while defining the predetermined range in the actual space as the occupying space.

At this time, when the user who has issued the request cannot use the content associated information according to the request, the controller 11 informs the user who has issued the request of the error and refuses the setting of the virtual space (does not perform registration into the space database).

Note that, even with the content for which only specific user can perform association with the virtual space as described above, if the association with the virtual space is performed once, the content is presented to another user (whether this user has the usage right of the content does not matter) who enters the occupying space set with the virtual space. This leads to promotion of utilization and purchase of the content, for example.

[Time Setting]

Furthermore, in the above description of the present exemplary embodiment, the virtual space setting request includes the occupying space identification information and the content identification information. However, in addition to those, the virtual space setting request transmitted to the server device 10 by the user may include time zone identification information for identifying time when the virtual space is to be set (start date and time, and end data and time).

In this case, the server device 10 that performs the processing for setting the virtual space stores, in the space database, an entry that associates the occupying space identification information received as the virtual space setting request, the content identification information for identifying the content to be presented in the virtual space to be set in the occupying space, the information for identifying the user who has issued the virtual space setting request (the information accepted at authentication may be used), and the time zone identification information with each other.

In this example, when performing the operation as the space management unit 33, the server device 10 performs the operation by checking, for each entry included in the space database, whether or not the hexahedral space, in the actual space, indicated by the occupying space identification information included in the entry and the hexahedral space, in the actual space, indicated by the occupying space identification information according to the virtual space setting request overlap each other, and whether or not a time zone identified by the time zone identification information included in the entry and a time zone identified by the time zone identification information according to the virtual space setting request overlap each other.

When an entry that satisfies the above-described conditions is present in the entries included in the space database, the server device 10 performs the processing for refusing the setting of the virtual space.

In this example, even in a case where the occupying spaces intersect each other, when the time zones to be set are different from each other, the virtual space is set.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal device connected to a server device in a communicable manner, the terminal device comprising:
   a position identification section that identifies a position in an actual space;
   a setting section that sets a virtual space associated with content associated information associated with predetermined content in the actual space, the setting section setting the virtual space in an occupying space while defining a predetermined range in the actual space as the occupying space; and
   a performance section that receives the content associated information in the virtual space from the server device and performs predetermined information processing,
   the server device comprising:
   a position-related information reception section that receives information for identifying a position of the terminal device in an actual space from the terminal device;
   a request acceptance section that accepts a request for setting a virtual space associated with content associated information associated with the predetermined content in the actual space, the request being for setting the virtual space in an occupying space while defining a predetermined range in the actual space as the occupying space; and
   a setting section that performs processing for setting the virtual space based on the request, the setting section performing predetermined processing in a case where a range, in the actual space, occupied by the requested occupying space and a range, in the actual space, occupied by another occupying space that is already set based on a request accepted from another user overlap each other.

2. The terminal device connected to the server device in the communicable manner according to claim 1, wherein the setting section performs processing for setting the virtual space based on the request, the setting section refusing the setting of the virtual space as the predetermined processing in the case where the range, in the actual space, occupied by the requested occupying space and the range, in the actual space, occupied by the other occupying space that is already set based on the request accepted from the other user overlap each other.

3. The terminal device connected to the server device in the communicable manner according to claim 1, wherein the setting section performs processing for setting the virtual space based on the request, the setting section performing the setting of the virtual space as the predetermined processing by defining a range at least excluding the range, in the actual space, of the other occupying space that is already set in the range of the requested occupying space in the actual space as the occupying space in the case where the range, in the actual space, occupied by the requested occupying space and the range, in the actual space, occupied by the other occupying space that is already set based on the request accepted from the other user overlap each other.

4. The terminal device connected to the server device in the communicable manner according to claim 1, wherein in a case where the range, in the actual space, occupied by the requested occupying space includes an excluded range that is a range, in the actual space, that is limited in setting in advance, the setting section performs the setting of the virtual space by defining a range excluding the excluded range as the occupying space.

5. The terminal device connected to the server device in the communicable manner according to claim 1, wherein in a case where an obstacle difficult for the user to pass through is present in the range, in the actual space, occupied by the requested occupying space, the setting section performs the setting of the virtual space by selecting any one of regions, in the actual space, partitioned by the obstacle, defining a range other than the selected region as an excluded range, and defining a range excluding the excluded range as the occupying space.

6. The terminal device connected to the server device in the communicable manner according to claim 1,
   wherein the server device is connected, in an accessible manner, to a feature point database that accumulates feature point information extracted from image data captured at each position in the actual space in association with information regarding the position where the image data is captured,
   the position-related information reception section receives, from the terminal device, the image data captured of a periphery of a location where the terminal device is present and wide-area position identification information for identifying a range, in the actual space, where the terminal device is present,
   a position identification section that generates information for identifying a position of each terminal device is provided, the position identification section extracting, for each terminal device, the feature point information from the image data received from the terminal device, obtaining information regarding the positions accumulated in the feature point database in association with the extracted feature point information, and obtaining information regarding a position included in a predetermined range that is identified by the wide-area position identification information received from the terminal device among pieces of the obtained information regarding the positions as the information for identifying the position of the terminal device, and
   the setting section determines a range, in the actual space, for setting the virtual space by using the information for identifying the position of the terminal device that has issued the request for setting the virtual space.

7. The terminal device connected to the server device in the communicable manner according to claim 1, wherein the server device determines whether or not the content associated information according to the request the request acceptance section accepts from the user is available to the user, and performs processing for setting the virtual space based on the request in a case where the content associated information is available.

8. An information processing system comprising:
   a terminal device comprising:
      a position identification section that identifies a position in an actual space;
      a setting section that sets a virtual space associated with content associated information associated with predetermined content in the actual space, the setting section setting the virtual space in an occupying space while defining a predetermined range in the actual space as the occupying space; and
      a performance section that receives the content associated information in the virtual space from the server device and performs predetermined information processing; and
   a server device comprising:

a position-related information reception section that receives information for identifying a position of the terminal device in an actual space from the terminal device;

a request acceptance section that accepts a request for setting a virtual space associated with content associated information associated with the predetermined content in the actual space, the request being for setting the virtual space in an occupying space while defining a predetermined range in the actual space as the occupying space; and a setting section that performs processing for setting the virtual space based on the request, the setting section performing predetermined processing in a case where a range, in the actual space, occupied by the requested occupying space and a range, in the actual space, occupied by another occupying space that is already set based on a request accepted from another user overlap each other.

* * * * *